US012608364B2

(12) United States Patent
Tsiatsikas

(10) Patent No.: US 12,608,364 B2
(45) Date of Patent: Apr. 21, 2026

(54) METHOD AND SYSTEM FOR OPTIMIZING BLOCKCHAIN COMPLEXITY

(71) Applicant: ATOS Public Safety, LLC, Irving, TX (US)

(72) Inventor: Zisis Tsiatsikas, Salonika (GR)

(73) Assignee: ATOS PUBLIC SAFETY LLC., Irving, TX (US)

( * ) Notice: Subject to any disclaimer, the term of this patent is extended or adjusted under 35 U.S.C. 154(b) by 340 days.

(21) Appl. No.: 18/346,919

(22) Filed: Jul. 5, 2023

(65) Prior Publication Data

US 2024/0176776 A1     May 30, 2024

(30) Foreign Application Priority Data

Nov. 29, 2022    (EP) ..................................... 22210329

(51) Int. Cl.
| | |
|---|---|
| *G06F 16/23* | (2019.01) |
| *G06F 16/28* | (2019.01) |
| *G06Q 50/26* | (2024.01) |

(52) U.S. Cl.
CPC ........ *G06F 16/2379* (2019.01); *G06F 16/285* (2019.01); *G06Q 50/265* (2013.01)

(58) Field of Classification Search
CPC .... G06F 21/64; G06F 16/2379; G06F 16/285; H04L 9/50; H04L 9/3221; H04L 2209/463; H04W 4/90; G06Q 50/265
USPC ...................................................... 455/404.1
See application file for complete search history.

(56) References Cited

U.S. PATENT DOCUMENTS

| | | | |
|---|---|---|---|
| 2019/0392392 A1* | 12/2019 | Elden .................... | H04L 9/3239 |
| 2020/0127812 A1 | 4/2020 | Schuler et al. | |
| 2020/0134760 A1* | 4/2020 | Messerges ............. | G07C 13/00 |
| 2020/0296111 A1* | 9/2020 | Karame ................ | H04L 9/3239 |
| 2023/0118664 A1* | 4/2023 | Andriopoulou ......... | H04L 67/63 709/223 |
| 2023/0224175 A1* | 7/2023 | Tsiatsikas ............... | G06F 21/64 713/168 |
| 2023/0319535 A1* | 10/2023 | Carney Landow ..... | H04W 4/02 455/404.2 |

OTHER PUBLICATIONS

Extended European Search Report for European Application No. 22210329.3 dated May 4, 2023.
Subhi M. Alrubei, et al., "The Use of Blockchain to Support Distributed AI Implementation in IoT Systems" IEEE Internet of Things Journal, vol. 9, No. 16, 15, Aug. 2022.
Hao Guo, et al., "Proof-of-Event Recording System for Autonomous Vehicles: A Blockchain-Based Solution" IEEE Access, vol. 8, date of Publication Oct. 8, 2020.

* cited by examiner

*Primary Examiner* — Maria El-Zoobi
(74) *Attorney, Agent, or Firm* — Meagher, Emanuel, Laks, Goldberg & Liao, LLP

(57) ABSTRACT

A method and a system for optimizing blockchain complexity can be configured for eliminating the dispersion of context-related transactions. Embodiments can include monitoring node assigning a leadership role to be a leader node for an upcoming mining round. The leader node can cluster one or more transactions for an incident and begin mining one or more blocks. A non-leader node can check if one or more transactions may relate to the incident. Once no related incidents are found, the mining may be stopped or other suitable actions can be taken.

14 Claims, 5 Drawing Sheets

METHOD AND SYSTEM FOR OPTIMIZING BLOCKCHAIN COMPLEXITY

CROSS-REFERENCE TO RELATED APPLICATIONS

The present application claims priority to European Patent Application No. EP 22 210 329.3, which was filed on Nov. 29, 2022. The entirety of this patent application is incorporated by reference herein.

FIELD

The present invention relates to a method and a system for optimizing blockchain complexity. In particular, a method and system for optimizing blockchain complexity by eliminating the dispersion of context-related transactions.

BACKGROUND

It is known that blockchain networks use a special mechanism for broadcasting transactions to the network. The aim of this mechanism is that every node should keep in the mempool the transactions which are submitted to the network by the clients. This happens so that all the nodes will compete to mine the same transactions like in the Proof of Work (PoW) consensus mechanism.

SUMMARY

I determined that at least some private blockchain networks where other consensus schemes can be deployed, like the Proof of Authority (PoA) algorithm, it may not always be necessary that all the nodes mine the same transactions. For example, in case there is a blockchain network where each node is, for example, a Public Safety Answering Point (PSAP) element, and each emergency incident corresponds to a blockchain transaction, the PSAP node which is responsible to handle an emergency call should be also the blockchain node that will mine a relevant block that contains this transaction. In this case the routing mechanism offers the way to send the transactions to the nodes which are responsible to mine them. So, there is no special reason to broadcast all the emergency incidents to all the other PSAP elements, even though this can also work in the case of the emergency architectures. For example, when a PSAP node answers a call, it should serve the call based on the fact that this is the responsible PSAP that handles emergency calls for this jurisdiction. So, there is no special reason to broadcast the transactions to the network so as to have other PSAPs that will try to mine these specific transactions (e.g., emergency incident-based transactions). Taking into account all the above, it seems that it would be far better to group relevant transactions, in terms of the emergency context (i.e., they refer to the same emergency incident) in a specific or adjacent, or neighbor blocks, rather than dispersing them in different blocks which may have a big distance between them. Moreover, the examples of misrouted calls and antenna overload issues (especially in large scale emergency incidents, or in those cases where the deployed infrastructure has not been selected to cover the needs of the subscribers in all seasons of the year, e.g., in the mountains etc.) indicate that context-related transactions can be dispersed among different blocks, something that ends up creating an overhead to the traversing operations in the blockchain ledger, especially for the nodes that need to search the blocks in order to find similar transactions. In the context of the emergency ecosystem, it also means to search for information for similar incidents.

Therefore, embodiments of the present invention can be based on the object to provide a method and a corresponding system for optimizing blockchain complexity (e.g. by eliminating the dispersion of context-related transactions). One other object of some embodiments can be to build, by design, a chain in which each context-related transaction, e.g. emergency incident will be included in the same, or in adjacent blocks.

A method for optimizing blockchain complexity can be provided in which the method can include the steps of assigning, by a monitoring node of a blockchain network, to a node of the blockchain network the leadership role to be a leader node for an upcoming mining round; clustering, by the leader node, one or more transactions related to one single incident in one or more of k blocks to be mined; beginning, by the leader node, to mine the one or more k block and sending, by the leader node, each mined block of the one or more k block to one or more other non-leader node in the blockchain network to validate the one or more transactions in the one or more of the k blocks; checking, by the one or more other non-leader nodes, if they comprise one or more transactions related to one or more incidents that correspond to one or more of the k blocks; ending the method if the one or more other non-leader nodes does not comprise one or more transactions related to one or more incidents that correspond to one or more of the k blocks.

According to a preferred embodiment, if the one or more other non-leader node comprises one or more transactions related to one or more incident that corresponds to one or more of the k blocks, the method further comprises: communicating, by the one or more other non-leader nodes, to the leader node the one or more transactions related to one or more of the incidents that correspond to one or more of the k blocks and conveying, by the one or more other non-leading nodes the information about the one or more transactions related to one or more incidents; re-forming or re-shaping, by the leader node, the one or more blocks of the k blocks by including the one or more transactions related to the one or more incidents which was conveyed by the one or more other nodes and initiating the mining process for the one or more blocks.

According to another preferred embodiment, if after the re-forming or re-shaping, by the leader node, further other one or more transactions related to one or more of the incidents that corresponds to one or more of the k blocks is conveyed by the one or more other non-leading nodes to the leader node, the method further comprises: canceling, by the leader node, the beginning of the mining of the one or more k blocks which comprises the further other one or more transactions related to the one or more incidents that corresponds to one or more of the k blocks conveyed by the one or more other non-leading nodes and sending, by the leader node, to the one non-leader nodes that will become the next leader node after s seconds the further other one or more transaction related to the one or more incident that corresponds to one or more of the k blocks conveyed by the one or more other non-leading nodes together with the further other one or more transactions related to the aforementioned transactions of the leader node.

According to still another preferred embodiment, the method can also include ending the method, if the one or more other non-leader nodes does not comprise further other one or more transactions related to one or more incidents that correspond to one or more of the k blocks.

Further, according to a preferred embodiment, if the one or more other non-leader nodes comprises one or more transaction related to one or more incidents that correspond to one or more of the k blocks, the method further comprising: communicating, by the one or more other non-leader nodes, to the leader node the one or more transactions related to one or more of the incidents that correspond to one or more of the k blocks and conveying, by the one or more other non-leading nodes, the information about the one or more transactions related to one or more incidents; canceling, by the leader node, the beginning of the mining of the blocks which should comprise the one or more transactions related to one or more of the incidents that correspond to one or more of the k blocks conveyed by the one or more other non-leader nodes and sending, by the leader node, to the one non-leader node that will become the next leader node after s seconds the one or more transactions related to one or more of the incidents that correspond to one or more of the k blocks conveyed by the one or more other non-leading nodes together with the one or more transactions related to the aforementioned transaction of the leader node.

According to yet another preferred embodiment, after s seconds have passed, the method can also include mining, by the next leader node, the one or more blocks that comprises the one or more transactions or the further other one or more transactions related to one or more of the incidents that correspond to one or more of the k blocks conveyed by the previous leader node or conveyed by the one or more other non-leader nodes.

According to yet another preferred embodiment, the s seconds can be set to a maximum time period and are selected in this way so that the rest of the non-leading nodes will manage to communicate the similar related one or more transaction to the non-leading node that will become the next leader node after the s seconds.

According to yet another preferred embodiment, the method can also include clustering, by the leader node, one or more transactions related to two or more different single incidents in one or more blocks of the k blocks to be mined.

According to yet another preferred embodiment, wherein the leader node and/or the one or more non-leader nodes of the blockchain network is one of a Public Safety Answering Point (PSAP), or an Emergency Service Routing Proxy (ESRP), or a Session Border Controller (SBC) element. It should be appreciated that a PSAP, ESRP, or an SBC element is a type of communication device that includes a processor connected to a non-transitory memory and at least one transceiver. Such devices can also include at least one input device communicatively connectable to the processor and at least one output device communicatively connectable to the processor. Examples of input devices can include a keyboard, a pointer device, a mouse, a microphone, a stylus, or a touch screen display. Examples of an output device can include a speaker, a display, a printer, or other type of output device. In some embodiments, an ESRP can be a type of server. The SBC element can be a gateway in some embodiments. In other embodiments, an SBC element can be a network node that is configured for session border control.

According to yet another preferred embodiment, wherein the blockchain network is part of one of an emergency network, a governmental network, a military network, a private network, a broadcasting network or a trading or banking network and the one or more incident is one of a topic specific for the aforementioned networks.

According to yet another preferred embodiment, the leader node can be assigned for a time frame of m seconds to mine the k blocks. All transactions of the currently responsible leader node can be created in a single block. However, since this is difficult, a default of at most k blocks can be specified, but never up to n blocks. This can be specified due to the fact that the emergency calls which are received by the current node may be received slightly after the current node has finished holding the leadership token for this mining round. This has as a consequence that the leader node will be able to mine the related transactions in the next round and thus there will be at least 2 blocks in the chain holding context-related transactions, dispersed in the chain, non-adjacent blocks. More specifically, there will be a distance of at least $(c-1*k)$ other blocks between the context-related blocks, where c is the number of nodes in the blockchain network and k is the number of blocks that could be mined by each node in a single mining round.

Through this, and the fact that other non-leader nodes may also hold similar context-related transactions to the current leader node, say due to misrouted calls and so on, the searching complexity O will always diverge to a linear value O(c), proportional to the number of blockchain nodes equal to c. Where k can be defined for converging to a constant value, say for example, $k=10$, preferably $k=8$ and especially preferably $k=5$.

According to yet another preferred embodiment, wherein the monitoring node is an Emergency Service Routing Proxy (ESRP) of an emergency network, or a Session Border Controller (SBC).

According to yet another preferred embodiment, wherein the method further comprises monitoring, by the monitoring node, the one or more other nodes of the network regarding present and future leadership role and/or regarding one or more transaction to be mined by the respective leader node in each mining round.

According to yet another preferred embodiment, upon detecting, by the monitoring node, that two or more other nodes of the network comprise one or more transactions related to one or more incidents; taking over the leadership role, by the monitoring node order to mine one or more common blocks comprising the one or more transactions related to the one or more incidents; sending, by the monitoring node, to the two or more other nodes which comprises the one or more transactions related to the one or more incidents a notification to prevent the two or more other nodes from mining the one or more transactions related to the one or more incidents; querying, by the monitoring node, from the two or more other nodes the one or more transactions related to the one or more incidents; receiving, by the monitoring node, from the two or more other nodes the one or more transactions and all information related to the one or more incidents; mining, by the monitoring node, the one or more transactions related to the one or more incidents in one or more common blocks; sending, by the monitoring node, an acknowledgement to the other nodes that the one or more of the k blocks was mined successfully; and passing, by the monitoring node, the leadership role to the next node who will be the next leader node in s seconds.

A system for optimizing blockchain complexity is also provided. Embodiments of the system can be adapted to perform the steps of the method discussed above or other exemplary embodiments of the process discussed herein. The system can include one or more nodes. Each node can be a device of a network, for example. For instance, each node can be a communication device that includes a processor connected to a non-transitory memory and at least one transceiver. Such devices can also include at least one input device communicatively connectable to the processor and at least one output device communicatively connectable to the processor. Examples of input devices can include a keyboard, a pointer device, a mouse, a microphone, a stylus, or a touch screen display. Examples of an output device can include a speaker, a display, a printer, or other type of output device. In some embodiments, a node can be a PSAP, an ESRP, or an SBC element.

It has also to be noted that aspects of the invention have been described with reference to different subject-matters. In particular, some aspects or embodiments have been described with reference to apparatus type claims whereas other aspects have been described with reference to method type claims. However, a person skilled in the art will gather from the above and the following description that, unless otherwise notified, in addition to any combination between features belonging to one type of the subject-matter also any combination between features relating to different types of subject-matters is considered to be disclosed with this text. In particular, combinations between features relating to the apparatus type claims and features relating to the method type claims are considered to be disclosed.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawing(s).

Figure 1:
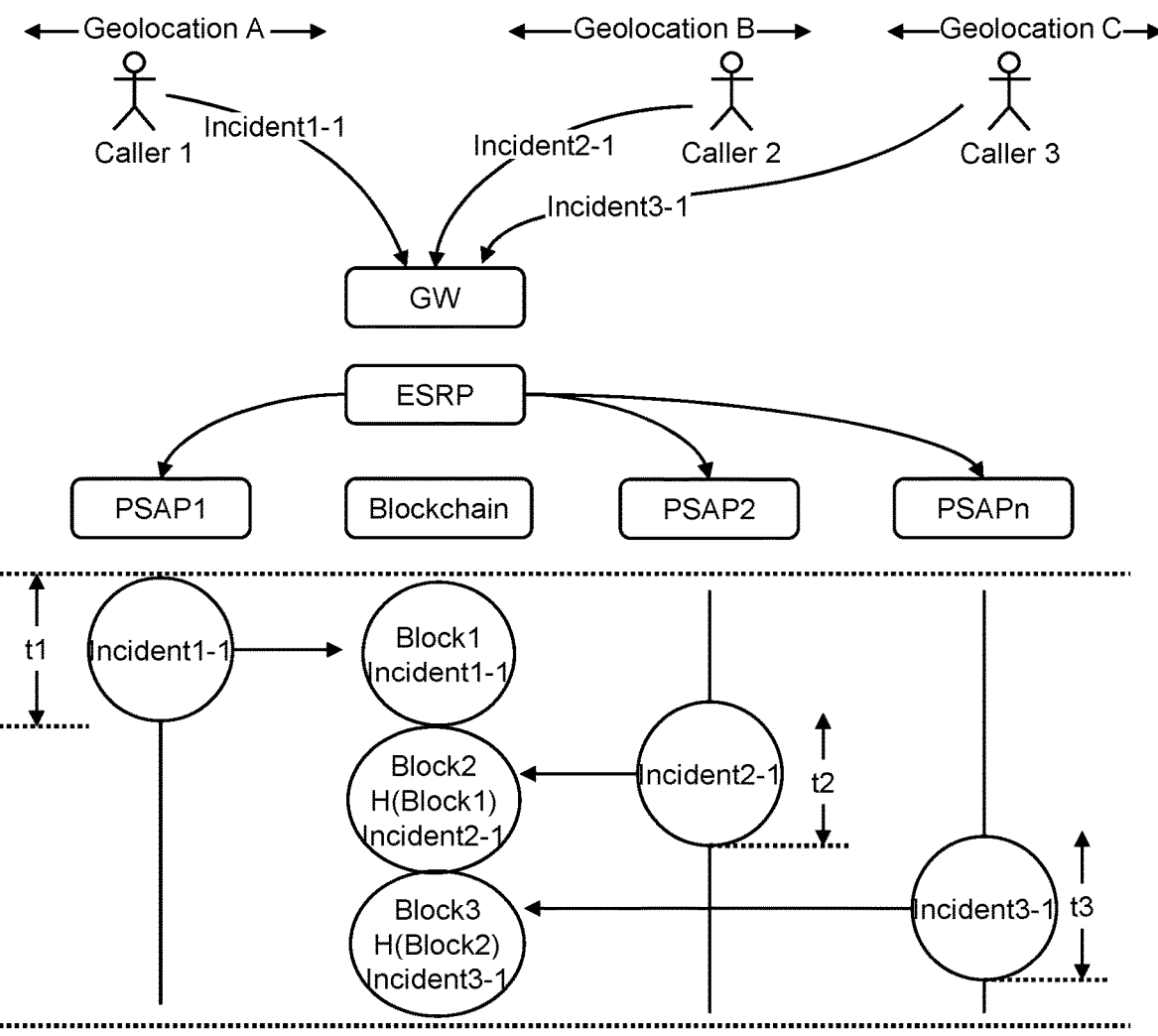
FIG. 1 shows a schematic illustration of the method according to an embodiment of the invention.

Reference numerals utilized in the drawings include the following:

| | |
|---|---|
| GW | Gateway |
| PSAP | Public Safety Answering Point |
| ESRP | Emergency Service Routing Proxy |
| t1-tn | time frames t1 to tn |
| LoS | Line of Sight |

DETAILED DESCRIPTION

FIG. 1 presents in a schematically illustration an overview of the underlying architecture of an exemplary embodiment of my method for optimizing blockchain complexity. In this overview, the architecture is illustrated by means of an example from the field of emergency networks. Here each PSAP element (PSAP1, PSAP2, PSAPn) receives several emergency calls, also referred to as emergency incidents or simply incidents, based on the standard routing mechanism of the Emergency Services IP Network (ESInet). The ESInet can be a managed IP network that is used for emergency services communications, and which can be shared by all public safety agencies (PSAPs). It can provide the IP transport infrastructure upon which independent application platforms and core services can be deployed, including, but not restricted to, those necessary for providing Next Generation 9-1-1 or 1-1-2 (NG 9-1-1 or NG 1-1-2) services. NG 9-1-1 or NG 1-1-2 are IP-based systems comprised of hardware, software, data, and operational policies and procedures that: provide standardized interfaces from emergency call and message services to support emergency communications; process all types of emergency calls, including voice, data, and multimedia information; acquire and integrate additional emergency call data useful to call routing and handling; deliver the emergency calls, messages, and data to the appropriate PSAP and other appropriate emergency entities; support data or video communications needs for coordinated incident response and management.

ESInets may be constructed from a mix of dedicated and shared facilities. ESInets may be interconnected at local, regional, state, federal, national and international levels to form an IP-based inter-network (network of networks). The term ESInet designates the network, not the services that ride on the network. Each node of such an ESInet mines the transactions which correspond to the emergency calls/incidents every time it is assigned a leader node, in specific time frames, say, t1, t2, t3. For example, in FIG. 1 each PSAP element (PSAP1, PSAP2 and PSAPn) contributes a block in the blockchain with relevant transactions which corresponds to the emergency incidents/calls Incident1-1, Incident2-1, Incident3-1 that the PSAP elements PSAP1, PSAP2 and PSAPn have received and have the responsibility to answer. In detail, a first caller, referred to as Caller 1 in FIG. 1, reports an emergency Incident1-1 from geolocation A to the emergency call network. The same happens in a similar way for further emergency calls, in this case Incident2-1 from Caller 2 from geolocation B and for Incident3-1 from Caller 3 from geolocation C. All incidents are forwarded via a gateway (GW) to the Emergency Service Routing Proxy (ESRP) which forwards the emergency calls or incidents to the corresponding responsible PSAPs. Now the PSAP selected as the leader node for time frame t1, in this case PSAP1, which is responsible for Incident1-1, begins to cluster the transactions related to this incident and then mines a first block, here Block1. In the next time frame t2, PSAP2 becomes the leading node and adds a second block, Block2, with the relevant transactions of Incident2-1 to the blockchain. In the third time frame t3, another PSAP, referred to here as PSAPn, adds another block, Block3, to the blockchain.

It should be appreciated that each PSAP element (e.g. PSAP1, PSAP2 and PSAPn) can be a type of communication device that includes a processor connected to a non-transitory memory and at least one transceiver. Such devices can also include at least one input device communicatively connectable to the processor and at least one output device communicatively connectable to the processor. Examples of input devices can include a keyboard, a pointer device, a mouse, a microphone, a stylus, or a touch screen display. Examples of an output device can include a speaker, a display, a printer, or other type of output device.

Also, the ESRP can be a type of communication device that includes a processor connected to a non-transitory memory and at least one transceiver. Such a device can also include at least one input device communicatively connectable to the processor and at least one output device communicatively connectable to the processor.

The gateway (GW) can also be a type of communication device that includes a processor connected to a non-transitory memory and at least one transceiver. Such a device can also include at least one input device communicatively connectable to the processor and at least one output device communicatively connectable to the processor.

Figure 2:
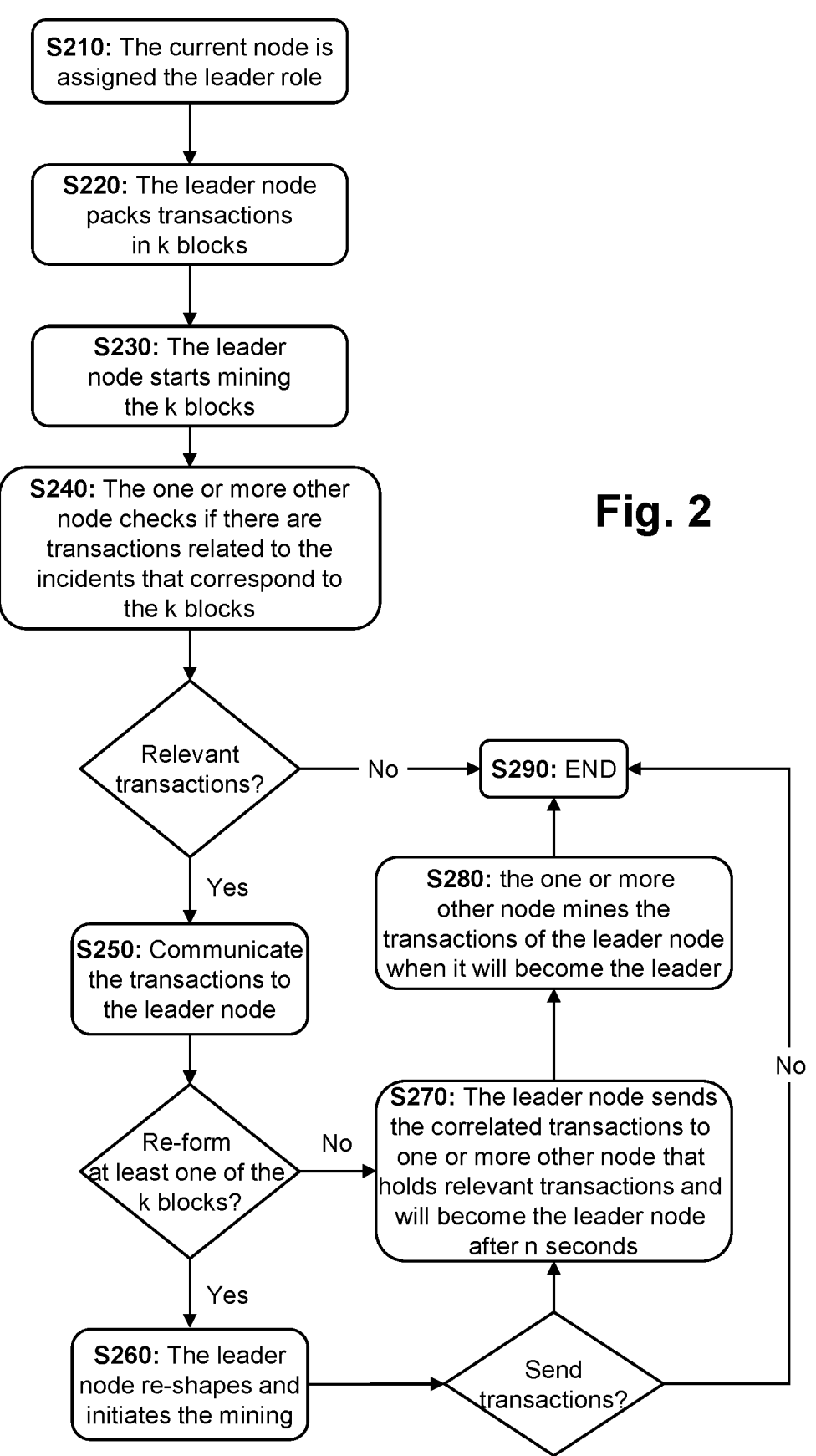
FIG. 2 shows a flowchart of the method according to another embodiment of the invention.

In FIG. 2, a flowchart of an overview of the steps of my method according to another embodiment of the invention is shown. Embodiments of my system and an embodiment of a node of the system can be configured to utilize an embodiment of this method. As may be seen in FIG. 2, in a first step S210, a node is assigned the leader role for this mining round by a monitoring node. This means that only this node can mine and add new transactions to the block-chain. In step S220, the leader node packs or clusters the transactions that correspond to the same incident in the same block. This happens with the aim to group and reduce the dispersion of the similar transactions in different blocks. This will help to create blocks that comprise transactions for the same incident, e.g. an emergency incident. Using this approach, the search and grouping operations can be far more efficient. Say, for example, that a PSAP which in this case pertains to a blockchain node, handles three different incidents in the time range between the last time this node was a leader node and the current time in which this node will become again the leader node. In other words, the time period between the two-time frames in which this node is not the leader node. This means that in the current mining round the leader node can add either a unique block with all these transactions, or mine sequentially k different blocks, each one containing the transactions which correspond to the calls of each incident. The second approach can be much more efficient, because at the end all the transactions of an incident will be grouped inside a unique block, and they will not be dispersed in different blocks. So, following this logic, a blockchain with condensed pieces of information inside the different blocks is created and thereby non-obviously cre-ating a list that will reduce the search operations always to a complexity very close to O (log log c), like in the case of interpolation search in the prior art, where c is the number of nodes in the blockchain network, related to a specific incident and O is a measure for the searching complexity. In step S230, the leader node starts mining sequentially the k blocks, where the transactions of each incident are packed in a different block. If that is not possible, the node packs or clusters the transactions in a way that it is logically closer to this approach, for example, the transactions of two different incidents are packed in a unique block. The leader node sends each mined block to the remaining non-leader nodes to validate the transactions. In step S240, the other nodes in the network which are not assigned the leader node, corre-late their incidents (e.g. emergency calls) and try to find out if there are any incidents which should be assigned to the leader node and concern the blocks which have been mined. For example, in the field of emergency handling, this is the case for misrouted calls, or calls which are initiated from the same geolocation but have been routed to different PSAPs due to Policy Routing Function (PRF) rules etc. In Step S250, the other nodes which hold similar transactions com-municate the information to the leader node. This instructs the leader node either to change the mining order of one of the k blocks or to revoke the mining of a block. Obviously, the mining order depends on the severity of the incident, in case this can be identified. But the best solution would be to revoke the mining process of this block and put it in the last position between the k different blocks that need to be mined by the leader node. This is done so that other nodes that may also hold similar transactions will have the time to commu-nicate the information to the leader node. In case the leader node revokes the mining of the block, this happens either because the correlated transactions belong to a block which have already been mined between the k blocks, or because the severity of the incidents indicates that there is a high chance that similar incidents may have been directed to other nodes (e.g. misrouted calls, antenna overload issues etc., in case of emergency calls to other PSAP elements). If the leader node does not select to re-form or re-shape one of the existing k blocks which will be mined in this time frame, it will directly go to step S270. In this step, the leader node sends the transactions to one of the possible other nodes which hold similar transactions (e.g. emergency call inci-dents). The leader node selects to send the transactions to the node which will become the leader node after s seconds. It is expected that s should correspond to the maximum time period in which another node will become the leader. This indicates that the current leader node selects the maximum time range so that other nodes may also send transactions which are similar to this incident. In step S280, the node which will become the leader node after s seconds mines these transactions when it will become the leader node. However, if the leader node does select to re-form or re-shape one of the existing k blocks, then after step S250, in step S260, the leader node re-shapes and initiates the mining process for one or more of the existing k blocks. And, after mining, the leader node sends the mined trans-actions to the other nodes in the network for validation. If one of the other nodes sends additional transactions to the leader node, the leader node will then handle these transac-tions according to step S270. If no transactions are trans-mitted to the leader node after step S260, the leader node finishes the mining process by passing the leader role to the next foreseen leader node and the method ends.

Figure 3:
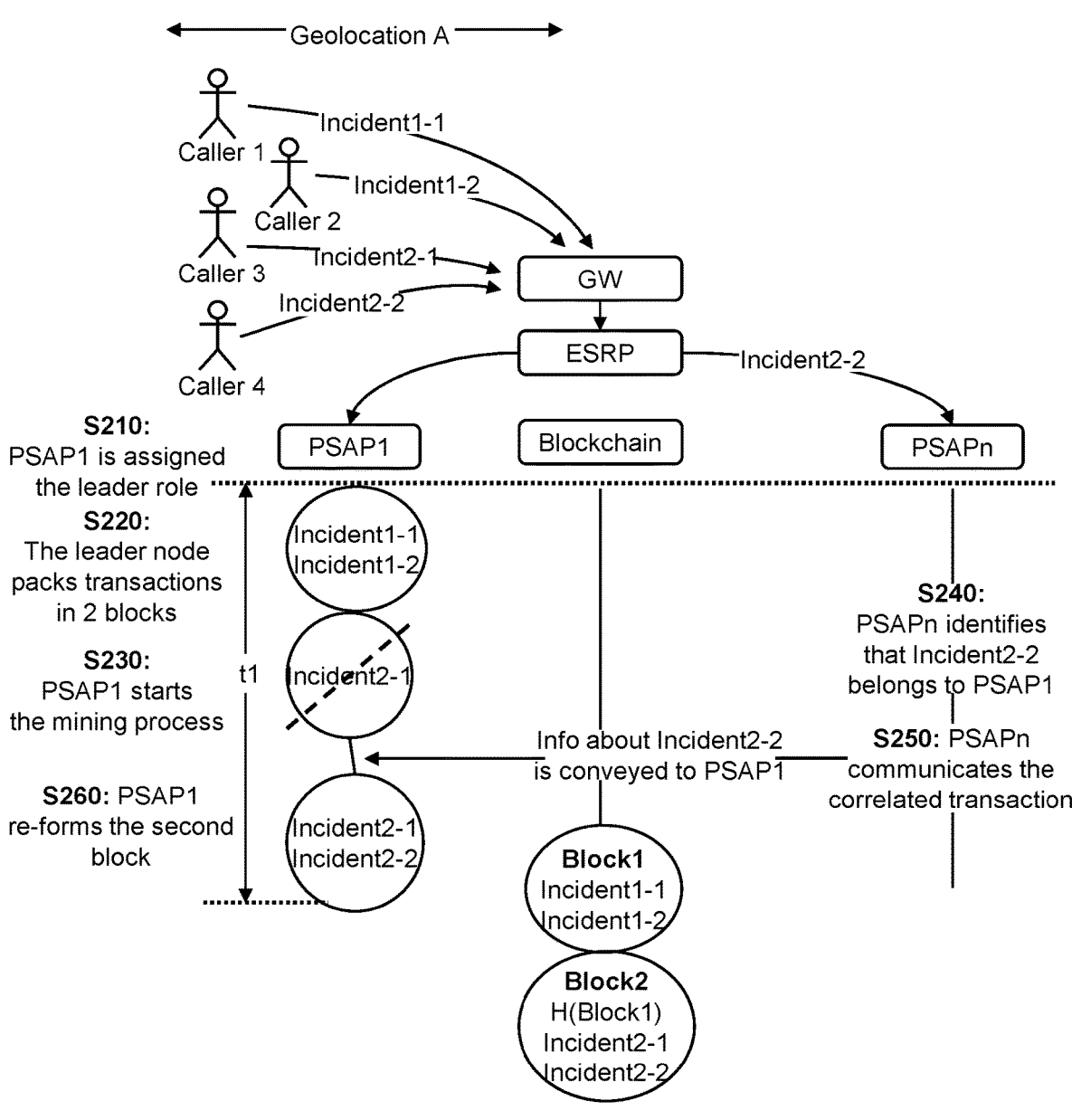
FIG. 3 shows a schematic illustration of the method according to another embodiment of the invention.

FIG. 3 shows in a schematical illustration of a scenario of another exemplary embodiment of my method and system. In the scenario of this embodiment, four different callers, namely as Caller 1, Caller 2, Caller 3 and Caller 4 which are located in the same geolocation A, and initiate emergency calls to the ESInet. Based on the standard routing rules, the calls or incidents should be routed to PSAP1 via the gateway (GW) and the ESRP, because PSAP1 is according to the routing rules the appropriate PSAP for geolocation A. In step S210 of this embodiment of the method, the node which corresponds to PSAP1 is assigned the leader role for the time frame t1. In the step S220, this leader node corresponding to PSAP1 clusters the transactions relating to Incident1-1, Incident1-2 and Incident2-1 in two blocks. Then, in step S230, the leader node corresponding to PSAP1 starts the mining process. Subsequently, in step S240, the node cor-responding to PSAPn identifies that Incident2-2 belongs to PSAP1. Then, in step S250, PSAPn communicates the correlated transaction by informing and conveying the infor-mation about Incident2-2 to PSAP1. The node correspond-ing to PSAP1, then, in step S260, re-forms or re-shapes the second block in a way that it also comprises Incident2-2. Due to antenna congestion problems or other circumstances, the call/incident (e.g., Incident2-2) triggered by Caller 4 was forwarded to PSAPn. If this call/incident was handled by PSAPn, it means that it would also have been handled later by PSAPn in another block. However, if this had been the case, it would have cost more to traverse the blockchain than a simple linear search, since two transactions related to the same incident would have been included in different blocks. To avoid that type of cumbersome processing, in Step S250, PSAPn sends back to the PSAP1 the information of Inci-dent2-2. At this point PSAP1 mines Block1, so it is possible to amend Block2, so that to also include the new transaction. In step S260, PSAP1 re-forms Block2 and mines also the second block. At the end the two new blocks mined in t1 are included in the blockchain ledger. In another case, if there is not enough time in time frame t1, the transaction relating to Incident2-2 should be communicated to PSAP1, and PSAP1 should plan to include it in a block the next time it becomes the leading node in a later time frame tn.

Figure 4:
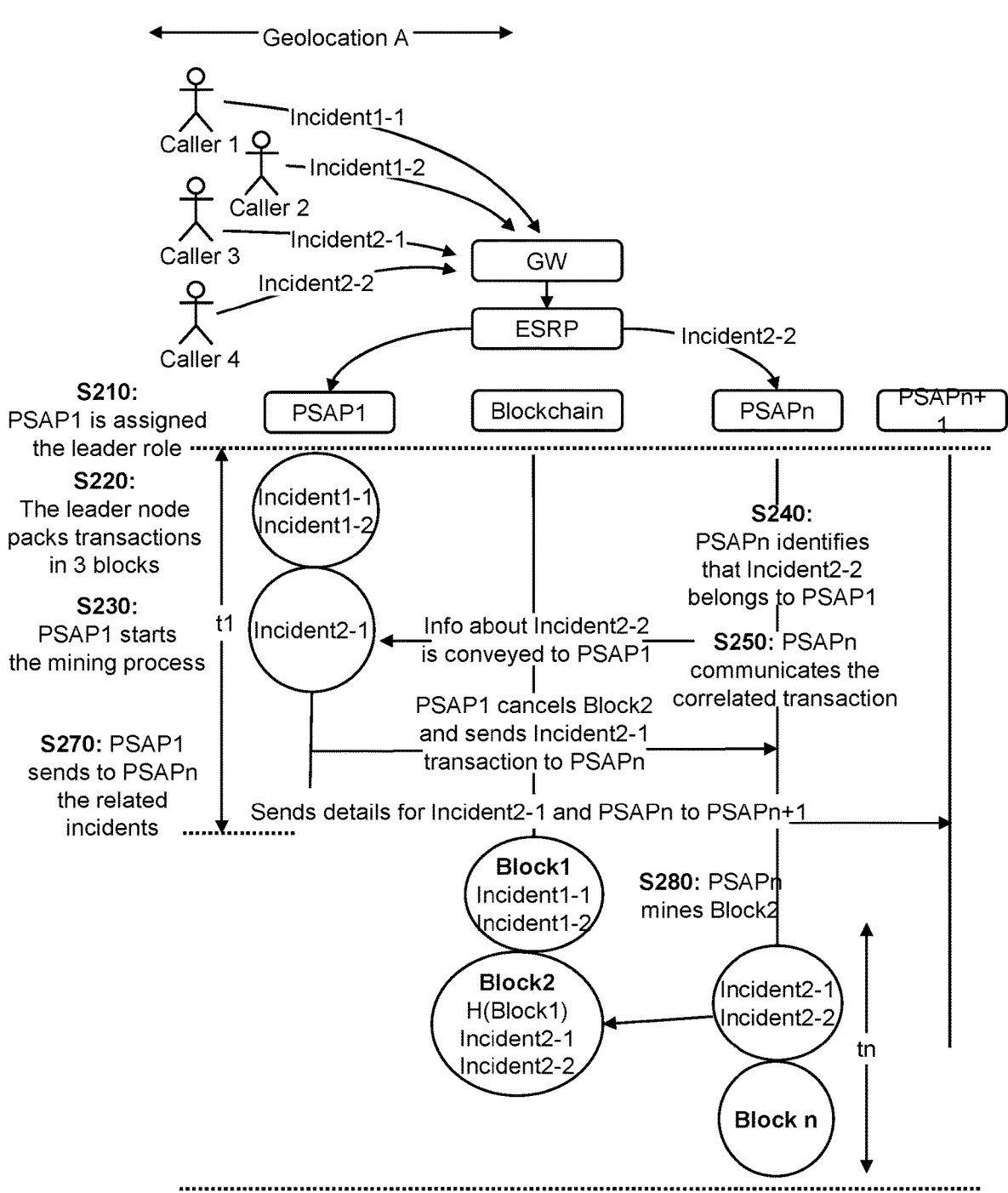
FIG. 4 shows a schematic illustration of the method according to another embodiment of the invention.

FIG. 4 shows in a schematic illustration another embodiment of my method that can be implemented in an embodiment of my system. The scenario of this embodiment is the same as shown for the previous embodiment depicted in FIG. 3. However, after the step S250 in which the leader node has been informed for the emergency calls (e.g., transactions) which are relevant for an emergency incident that is handled by itself, there is no time in the time frame t1 to re-pack a block. So, in step S270, PSAP1 communicates to PSAPn the correlated transaction Incident2-1 and cancels the mining of Block2. This happens so that PSAPn will mine all the transactions which are relevant to a specific emergency incident in this case Incident2. By transferring the transactions to this node, it is achieved that the specific block will include all the transactions of the incident by avoiding the dispersion in different blocks. In case this is a large-scale incident which is maybe a strong indication for more misrouted calls, PSAP1 forwards the information of PSAPn to other nodes, e.g. PSAPn+1 which may communicate the correlated emergency incidents later. In any case, if PSAP1 has many different options to pick among different PSAP elements which handle similar transactions, then it should start with the one that will become the leader node after s seconds (e.g., the maximum time period). This maximum time period is selected in this way so that the rest of the PSAP elements will manage to communicate the similar transactions to PSAP element PSAPn+1. In step S280, PSAPn mines the block (here Block2) that contains both Incident2-1, Incident2-2, and a further block (Block n) in time frame tn.

Figure 5:
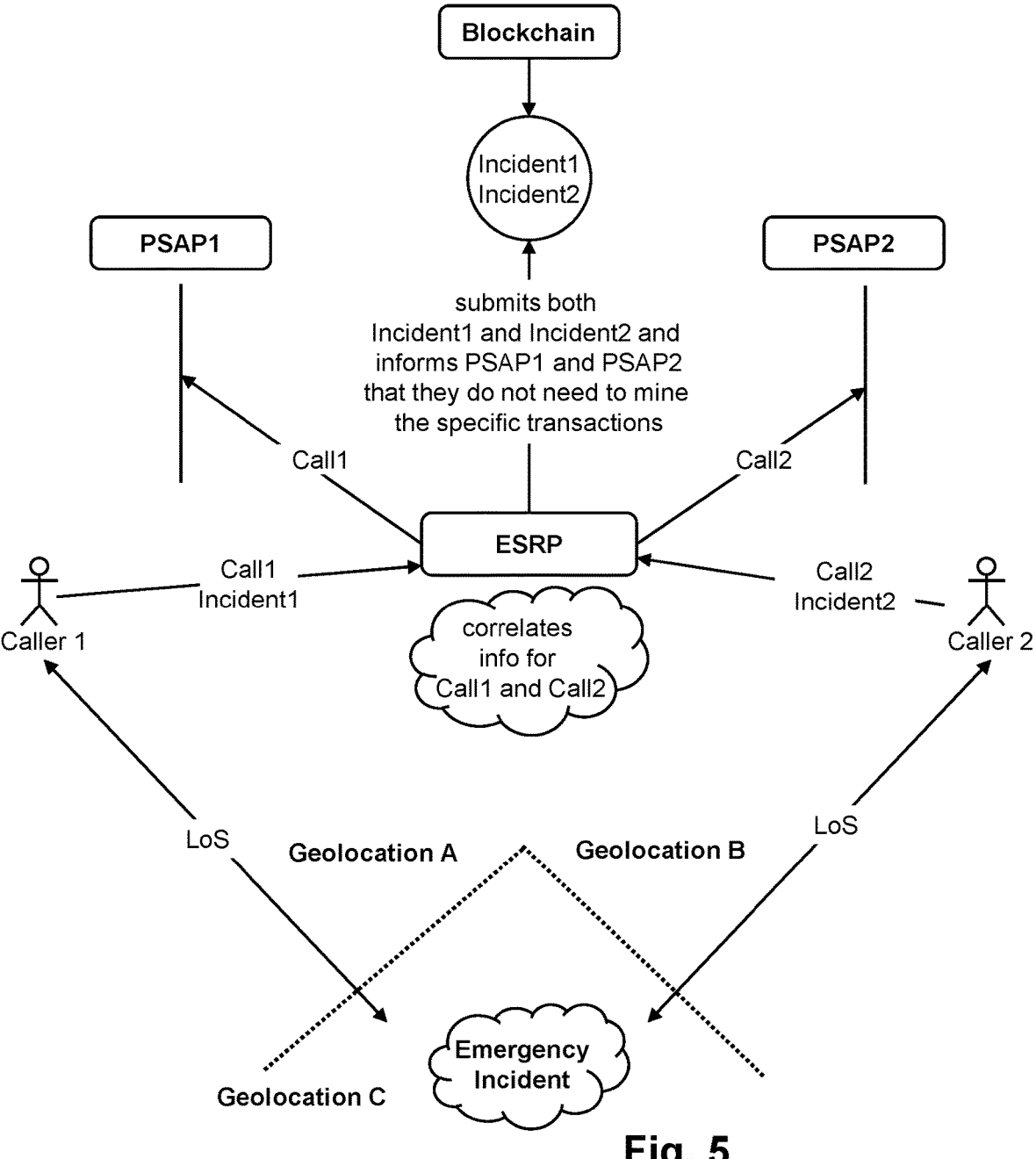
FIG. 5 shows a schematic illustration of the method according to another embodiment of the invention.

Another embodiment of the invention is depicted in a schematical illustration in FIG. 5. In this embodiment, the case of correlated transactions between different nodes, in this case the PSAP elements PSAP1 and PSAP2, which present only a small difference with regards to the leadership round is considered. That is, for example, that PSAP1 is leader in timeslot t1 and PSAP2 is leader in timeslot t5. In such a case, it may be difficult to generate and convey notifications between the nodes in order to cancel the mining process etc. as described in the previous embodiments. In such a case, assuming that a monitoring node, in this case the ESRP element, has knowledge of the round where each PSAP element is considered a leader, it may get the leadership-right token, in order to mine a common block with the related information.

FIG. 5 exemplifies the above-described case. Two callers from adjacent geolocations, namely Geolocation A and Geolocation B, have Line of Sight (LoS) with an emergency incident, say, in Geolocation C. Both of them call the NG 9-1-1 or NG 1-1-2 service (Call1, Call2), but they are routed in different PSAP elements (PSAP1, PSAP2). Still, this is the general scenario, also covered in previous embodiments, in the case that two PSAPs handle similar calls, or calls related to the same incident (Incident1, Incident2). The ESRP element detects that these calls concern the same or similar incident, say, for example, using an Interactive Voice Response (IVR) that receives and compares the incident details from the callers, or by comparing video streams of the two callers. The ESRP element in this case will forward the calls to the corresponding PSAP elements (PSAP1, PSAP2, respectively) but it will send them also a notification to prevent them from mining the specific transactions (Incident1, Incident2) which are related to the correlated calls (Call1, Call2). The PSAP elements (PSAP1, PSAP2) will send back to the ESRP element the details of the calls (Call1, Call2) which need to be included in the mined block and the ESRP element will mine the respective block. Using this approach, it is achieved the same effect of condensing the transactions in the same and/or adjacent blocks. The ESRP element will send back to the PSAP elements (PSAP1, PSAP2) an acknowledgement that the block was mined successfully. PSAP1 and PSAP2 will preserve their right to be leaders in the next distinct time frames, because they may have to mine other transactions, irrelevant to this emergency-case. Still, the corresponding calls-transactions which concern the emergency incident between two or more PSAP elements will be mined by the ESRP as shown in FIG. 5.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, computer device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for optimizing blockchain complexity, the method comprising the steps of:

assigning, by a monitoring node of a blockchain network, to a node of the blockchain network the leadership role to be a leader node for an upcoming mining round;

clustering, by the leader node, one or more transactions related to one single incident in one or more of k blocks to be mined;

beginning, by the leader node, to mine the one or more k blocks and sending, by the leader node, each mined block of the one or more k blocks to at least one non-leader node in the blockchain network to validate the one or more transactions in the one or more of the k blocks;

checking, by one or more other non-leader nodes, whether the one or more transactions relate to one or more incidents that correspond to the single incident of one or more of the k blocks;

ending the method upon a determination that one or more other non-leader nodes does not comprise one or more transactions related to one or more incidents that correspond to the single incident of one or more of the k blocks; and upon a determination that the one or more other non-leader nodes comprises one or more transactions related to one or more incidents that corresponds to the single incident of one or more of the k blocks:

communicating, by the one or more other non-leader nodes, to the leader node the one or more transactions related to the one or more of the incidents that correspond to the single incident of one or more of the k blocks and conveying, by the one or more other non-leader nodes, the information about the one or more transactions related to the one or more incidents;

upon a selection, by the leader node, to re-form or re-shape one or more of the k blocks, re-forming or re-shaping, by the leader node, the one or more blocks of the k blocks by including the one or more transactions related to the one or more incidents which was conveyed by the one or more other nodes and initiating the mining process for the one or more of the k blocks.

2. The method of claim 1, comprising, after the re-forming or re-shaping, by the leader node, conveying by the one or more other non-leader nodes to the leader node further other one or more transactions related to the one or more incidents that corresponds to the single incident of one or more of the k blocks;

canceling, by the leader node, a beginning of the mining of the one or more k blocks which comprises the further other one or more transactions related to the one or more incidents that corresponds to the single incident of one or more of the k blocks conveyed by the one or more other non-leader nodes; and sending, by the leader node, to a non-leader node of the one or more other non-leader nodes that will become the next leader node after s seconds the further other one or more transactions related to the one or more incidents that corresponds to the single incident of one or more of the k blocks conveyed by the one or more other non-leader nodes together with the further other one or more transaction related to the aforementioned transactions related to the single incident in one or more of the k blocks of the leader node.

3. The method of claim 1, comprising:

ending the method, in response to the one or more other non-leader nodes not comprising further other one or more transactions related to the one or more incidents that correspond to one or more of the k blocks.

4. The method of claim 1, comprising:

upon a determination that the one or more other non-leader node comprises one or more transaction related to one or more incidents that correspond to the single incident of the one or more of the k blocks:

communicating, by the one or more other non-leader node, to the leader node the one or more transactions related to one or more of the incidents that correspond to one or more of the k blocks and conveying, by the one or more other non-leader nodes, the information about the one or more transactions related to one or more incidents;

upon a non selection, by the leader node, to re-form or re-shape one or more of the k blocks, canceling, by the leader node, a beginning of the mining of the block which should comprise the one or more transactions related to one or more of the incidents that correspond to the single incident of one or more of the k blocks conveyed by the one or more other non-leader nodes; and sending, by the leader node, to the one non-leader node that will become the next leader node after s seconds the one or more transactions related to one or more of the incidents that correspond to the single incident of one or more of the k blocks conveyed by the one or more other non-leader nodes together with the one or more transactions related to the one or more transactions related to the single incident in the one or more of the k blocks of the leader node.

5. The method of claim 4, comprising:

after s seconds have passed, mining, by the next leader node, the one or more k blocks that comprises the one or more transactions related to the single incident and the one or more transactions related to the one or more incidents which were conveyed by the one or more other non-leader nodes and the further other one or more transactions related to the one or more incidents that correspond to the single incident of one or more of the k blocks conveyed by the previous leader node or conveyed by the one or more other non-leader nodes.

6. The method of claim 4, wherein the s seconds are set to correspond to a maximum time period after which one of the one or more other non-leader nodes will become the next leader node so that all of the one or more other non-leader nodes will manage to convey additional transactions related to the one or more incidents that corresponds to the single incident of one or more of the k blocks to the next leader node after the s seconds.

7. The method of claim 1, comprising:

clustering, by the leader node, one or more transactions related to two or more different single incidents in one or more blocks of the k blocks to be mined.

8. The method of claim 1, wherein the leader node is one of a Public Safety Answering Point, PSAP, an Emergency Service Routing Proxy, ESRP, or a Session Border Controller, SBC, element; and/or Each of the one or more non-leader nodes of the blockchain network is a PSAP, an ESRP, or an SBC element.

9. The method of claim 1, wherein the blockchain network is part of one of an emergency network, a governmental network, a military network, a private network, a broadcasting network or a trading or banking network and the one or more incidents is one of a topic specific for the aforementioned networks.

10. The method of claim 1, wherein the leader node is assigned for a time frame of m seconds to mine the k blocks.

11. The method of claim 1, wherein the monitoring node is an Emergency Service Routing Proxy (ESRP) of an emergency network, or a Session Border Controller (SBC).

12. The method of claim 1, comprising:

monitoring, by the monitoring node, the one or more other nodes of the network regarding present and future leadership roles and/or regarding one or more transactions to be mined by the respective leader node in each mining round.

13. The method of claim 12, comprising:

upon detecting, by the monitoring node, that two or more other nodes of the network comprise one or more transactions related to one or more incident;

taking over the leadership role, by the monitoring node order to mine one or more common blocks comprising the one or more transactions related to the one or more incidents;

sending, by the monitoring node, to the two or more other nodes which comprise the one or more transactions related to the one or more incidents a notification to prevent the two or more other nodes from mining the one or more transactions related to the one or more incidents;

querying, by the monitoring node, from the two or more other nodes the one or more transactions related to the one or more incidents;

receiving, by the monitoring node, from the two or more other nodes the one or more transactions and all information related to the one or more incidents;

mining, by the monitoring node, the one or more transactions related to the one or more incidents in one or more common blocks;

sending, by the monitoring node, an acknowledgement to the other nodes that the one or more of the k blocks was mined successfully; and passing, by the monitoring node, the leadership role to the next node who will be the next leader node in s seconds.

14. A system for optimizing blockchain complexity, the system comprising:

a monitoring node of a blockchain network communicatively connectable to a plurality of nodes of the blockchain network, the monitoring node configured to assign one of the plurality of nodes a leadership role to be a leader node for an upcoming mining round such that the leader node is configured to cluster one or more transactions related to one single incident in one or more k blocks to be mined an subsequently begin mining the one or more k blocks and send each mined block of the one or more k blocks to at least one other non-leader node of the plurality of nodes in the blockchain network to validate one or more transactions in the one or more k blocks;

at least one other non-leader node of the plurality of nodes configured to check whether the one or more transactions relate to the single incident of the one or more incidents that correspond to one or more of the k blocks; and, upon a determination that the one or more other non-leader nodes comprises one or more transactions related to one or more incidents that corresponds to the single incident of one or more of the k blocks, to communicate to the leader node s one or more transactions related to the one or more of the incidents that correspond to the single incident of one or more of the k blocks and convey to the leader node the information about said one or more transactions;

wherein the leader node is configured to select to re-form or re-shape one or more of the k blocks, and upon said selection, to re-form or re-shape the one or more blocks of the k blocks by including the one or more transactions related to the one or more incidents which was conveyed by the one or more other nodes and initiating the mining process for the one or more of the k blocks; and wherein the plurality of nodes of the blockchain are configured so that, upon a determination that the one or more other non-leader nodes does not comprise one or more transactions related to the single incident of the one or more incidents that correspond to the one or more of the k blocks, the mining round is endable.

\* \* \* \* \*